(12) United States Patent
Finkelstein

(10) Patent No.: US 6,769,618 B1
(45) Date of Patent: Aug. 3, 2004

(54) WALLET CARD WITH A MAGNIFYING LENS AND LIGHT

(75) Inventor: Alan Finkelstein, Beverly Hills, CA (US)

(73) Assignee: LensCard U.S., LLC, Los Angeles, CA (US)

( * ) Notice: Subject to any disclaimer, the term of this patent is extended or adjusted under 35 U.S.C. 154(b) by 7 days.

(21) Appl. No.: 09/767,317

(22) Filed: Jan. 22, 2001

Related U.S. Application Data

(63) Continuation-in-part of application No. 09/066,799, filed on Apr. 24, 1998, now Pat. No. 6,176,430, which is a continuation-in-part of application No. 08/758,640, filed on Nov. 27, 1996, now Pat. No. 5,856,661, which is a continuation-in-part of application No. 08/582,601, filed on Jan. 3, 1996, now Pat. No. 5,608,203, which is a continuation of application No. 08/250,801, filed on May 27, 1994, now abandoned, which is a continuation-in-part of application No. 08/197,218, filed on Feb. 16, 1994, now Pat. No. 5,434,405, which is a continuation-in-part of application No. 07/834,490, filed on Feb. 12, 1992, now Pat. No. 5,412,199.

(51) Int. Cl.$^7$ ............................................. G06K 19/00
(52) U.S. Cl. ..................... 235/487; 264/1.7; 264/1.9; 283/109; 283/904
(58) Field of Search ................. 235/487, 488, 235/493, 375, 380; 264/1.7, 1.9; 359/802, 806; 283/107, 109

(56) References Cited

U.S. PATENT DOCUMENTS

| 373,597 A | 11/1887 | McMicken |
|---|---|---|
| 2,234,942 A | 7/1941 | Nichols |
| 2,631,368 A | 10/1953 | Baukus |
| 2,826,959 A | 2/1958 | Schneider |
| 3,108,853 A | 10/1963 | Short et al. |
| 3,117,608 A | 1/1964 | Goss et al. |
| 3,140,883 A | 7/1964 | Anthony |
| 3,209,648 A | 10/1965 | Chapman |
| 3,408,347 A | 10/1968 | Vogel |
| 3,437,548 A | 4/1969 | Ayers |
| 3,571,957 A | 3/1971 | Cumming et al. |

(List continued on next page.)

FOREIGN PATENT DOCUMENTS

| DE | 6 92 00 552.7 | 4/1992 |
|---|---|---|
| EP | H0805 D/31 | 12/1980 |
| EP | 0 032 368 | 1/1981 |
| EP | 323-108 A | 12/1987 |
| EP | 0 496 544 | 1/1992 |
| FR | 2 726 384 | 10/1994 |
| GB | 2 222 280 | 8/1998 |
| JP | 55061587 | 5/1980 |
| JP | 56212679 | 12/1981 |
| JP | 59124818 A | 7/1984 |
| JP | 59124819 A | 7/1984 |
| JP | 361167506 | 7/1986 |
| JP | 1-171991 | 12/1987 |
| JP | 402006123 | 1/1990 |
| JP | 2-56680 | 4/1990 |
| JP | 2-93513 | 4/1990 |
| JP | 55-83015 | 6/1990 |
| JP | 40191815 | 4/1992 |

Primary Examiner—Michael G. Lee
Assistant Examiner—Ahshik Kim
(74) Attorney, Agent, or Firm—Blakely Sokoloff Taylor & Zafman LLP

(57) ABSTRACT

A wallet card adapted for use in reading externally stored information includes a transparent, substantially non-foldable semi-rigid base. The semi-rigid base comprises a magnifying lens. One or more lights are disposed in the card base to provide illumination.

5 Claims, 8 Drawing Sheets

U.S. PATENT DOCUMENTS

| | | |
|---|---|---|
| 3,712,707 A | 1/1973 | Henkes, Jr. |
| 3,963,309 A | 6/1976 | Schwab |
| 4,011,857 A | 3/1977 | Rice |
| 4,044,889 A | 8/1977 | Orentreich et al. |
| 4,067,947 A | 1/1978 | Miori |
| 4,076,384 A | 2/1978 | Deml et al. |
| 4,137,863 A | 2/1979 | Anglin |
| 4,294,782 A | 10/1981 | Froehlig |
| 4,393,610 A | 7/1983 | Adrian |
| 4,435,912 A | 3/1984 | Adrian et al. |
| 4,486,363 A | 12/1984 | Pricone et al. |
| 4,502,236 A | 3/1985 | Adrian |
| 4,509,823 A | 4/1985 | Moriguchi et al. |
| 4,571,497 A | 2/1986 | Henry et al. |
| 4,601,861 A | 7/1986 | Pricone et al. |
| 4,677,285 A | 6/1987 | Taniguchi |
| 4,805,680 A | 2/1989 | Ueno |
| 4,863,026 A | 9/1989 | Perkowski |
| 4,881,334 A | 11/1989 | Brown |
| 5,124,089 A | 6/1992 | Ohkoshi et al. |
| 5,151,582 A | 9/1992 | Fujioka |
| 5,183,597 A | 2/1993 | Lu |
| 5,198,168 A | 3/1993 | Thurston |
| 5,215,334 A | 6/1993 | Presson et al. |
| 5,359,597 A | 10/1994 | McLamb et al. |
| 5,534,101 A | 7/1996 | Keyworth et al. |
| 5,642,228 A | 6/1997 | Takezawa et al. |
| 5,681,871 A | 10/1997 | Molock et al. |
| 5,695,346 A | 12/1997 | Sekiguchi et al. |
| 6,070,990 A | 6/2000 | Dalton et al. |
| 6,073,854 A * | 6/2000 | Bravence et al. ............ 235/487 |
| 6,176,430 B1 * | 1/2001 | Finkelstein et al. ......... 235/487 |
| 6,296,188 B1 * | 10/2001 | Kiekhaefer ................. 235/487 |
| 6,325,284 B1 * | 12/2001 | Walker et al. ............... 235/380 |
| 6,390,372 B1 * | 5/2002 | Waters ....................... 235/487 |

* cited by examiner

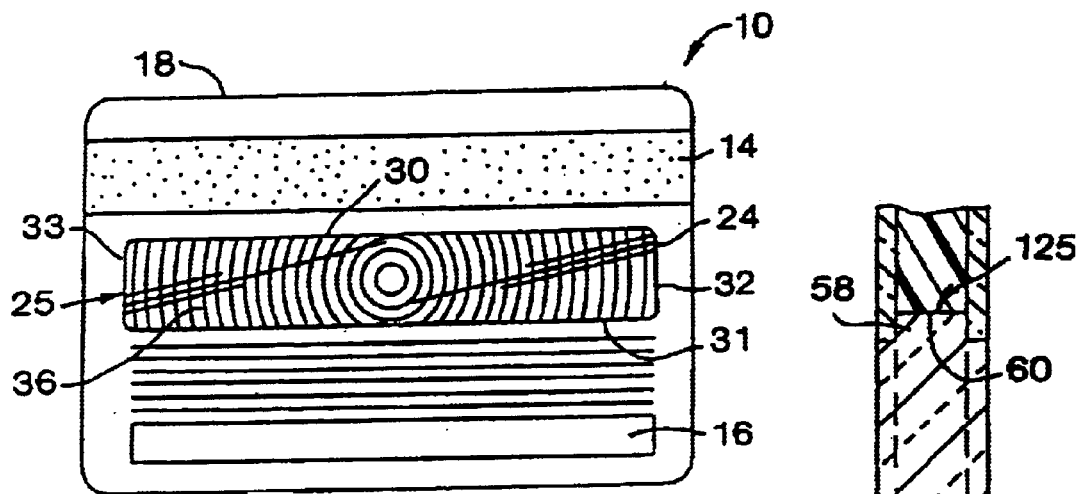
FIG. 2
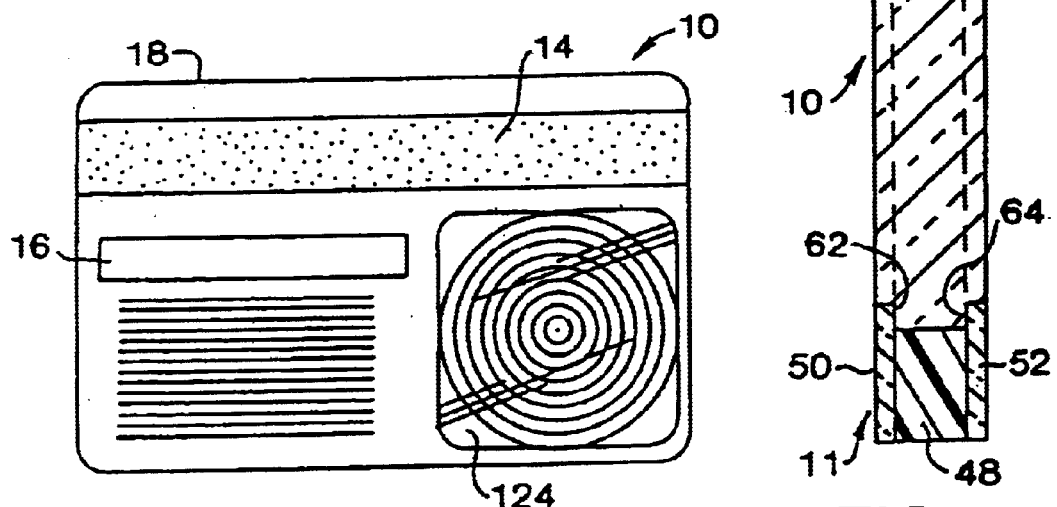
FIG. 4
FIG. 5

WALLET CARD WITH A MAGNIFYING LENS AND LIGHT

RELATED APPLICATIONS

This is a continuation-in-part of U.S. patent application Ser. No. 09/066,799 filed Apr. 24, 1998, now U.S. Pat. No. 6,176,430, which is a continuation-in-part of U.S. patent application Ser. No. 08/758,640 filed Nov. 27, 1996, now U.S. Pat. No. 5,856,661, which is a continuation-in-part of U.S. patent application Ser. No. 08/582,601 filed Jan. 3, 1996, now U.S. Pat. No. 5,608,203, which is a continuation of U.S. patent application Ser. No. 08/250,801 filed May 27, 1994, abandoned, which is a continuation-in-part of U.S. patent application Ser. No. 08/197,218, filed Feb. 16, 1994, now U.S. Pat. No. 5,434,405 which is a continuation-in-part of U.S. patent application Ser. No. 07/834,490, filed Feb. 12, 1992, now U.S. Pat. No. 5,412,199.

BACKGROUND OF THE INVENTION

1. Field of the Invention

The present invention relates to pocket magnifiers and is specifically directed to a wallet card, such as a credit card, having a magnifying lens and light.

2. Prior Art

There have long been reading lenses and magnifying glasses available to assist people in reading books, documents and the like without the use of reading glasses. These are particularly useful when the person encounters small print during an activity which makes it inconvenient or difficult to stop and put on reading glasses.

As an example, a book mark such as that shown in U.S. Pat. No. 3,140,883 issued to R. L. Anthony on Jul. 14, 1964 may be integrally attached to a book such as a telephone directory or a dictionary, wherein the end of the book mark is provided with a sealed pocket for receiving a plastic magnifying lens. The magnifying lens may be moved up and down the page as desired to provide magnification of the text in the book. This permits the user to read the text without first putting on his eyeglasses.

A pocket magnifier such as that shown in U.S. Pat. 3,409,347 issued to R. Vogel on Nov. 5, 1968 includes a pocket pouch adapted to be carried in the breast or hip pocket of the user or in a purse or wallet. The lens is formed of a transparent plastic sheet material having a substantial degree of stiffness and having fresnel lens contours molded into its upper surface. The lens unit may be slidably retracted into and extended out of the pocket The pocket magnifier may be easily utilized to magnify small print and the like when the user is in a location where it is not feasible or desirable to stop an activity in order to put on reading glasses.

Other examples of special purposes magnifying lens structures are shown, by way of example, in U.S. Pat. No. 4,044,889 entitled "Cosmetic Container Including Integrated Lens Structure," issued to S. Orentreich et al. on Aug. 30, 1977, and U.S. Pat. No. 4,393,610 entitled "Card Carrying Microfilm and Associated Reading Lens and Process of Forming Same," issued to D. Adrian on Jul. 19, 1983.

With the ever expanding use of credit cards and other transaction cards, there is an increasing requirement that the card user be able to verify a transaction at the point-of-use. This means the user must be able to read the card invoice to determine the accuracy of the information before he signs the invoice to indicate his acceptance. Since most of the information on the invoice is impact printed either on a carbon set or carbonless form, the print is not only controlled in size but is often of a low contrast with respect to the base form paper. This makes the form difficult to read, particularly for those who normally require reading glasses. Also, when the transaction card is used, it is often not convenient to take the time to put on reading glasses before reviewing the card invoice. While the pocket magnifiers of the prior art could be used for this purpose, use of such devices requires a separate activity which does not provide a great improvement over the use of reading glasses. As a result, many credit card users simply do not take the time and effort to accurately verify a transaction at the point-of-sale, relying on the sales clerk for the accuracy of the information. A transaction card incorporating a magnifying lens has been proposed in Japanese Utility Model Application Kokai No. 2-56680 published Apr. 24, 1990.

SUMMARY OF THE INVENTION

It is, therefore, an object and feature of the subject invention to provide for a financial transaction card having an integral magnifying lens permitting the user to immediately verify financial transactions at the point-of-sale without first requiring that the user put on reading glasses or the like.

It is another object and feature of the invention to enhance the use of credit cards by permitting immediate verification of credit card transactions by users normally having difficulty in reading small print, without requiring an additional activity of locating a magnifying lens or putting on reading glasses.

It is another object and feature of the subject invention to provide for a credit card having an integral magnifying lens and adapted for enlarging the small print generally used in the confined space of the credit card transaction form.

It is yet another object and feature of the invention to provide for an integral lens in a financial transaction card wherein the lens does not interfere with the machine readable information required on the card in order to complete a point-of-sale transaction.

The subject invention is directed to a wallet card, such as a credit card or the like, which incorporates an integral magnifying lens. Use of the card of the subject invention automatically places a magnifying lens at the disposal of the user, whereby, for example, the user may immediately verify a financial transaction at the point-of-sale without first locating a magnifying glass or taking the time and effort to put on reading glasses. As an illustrative example, the invention is particularly useful when making credit card transactions during an activity where the user would not normally be wearing his reading glasses. For example, during sports activities or other types of activities where a person does not normally encounter reading material, it may be desirable to make a credit card transaction in order to pay for rental of equipment or user fees or the like. By using the credit card of the subject invention, the user can immediately read and verify the financial transaction at the point-of-sale by placing the magnifying lens incorporated in the credit card over the printed material on the transaction form. Thus, the print is magnified with the card used for the transaction, eliminating the need to locate a pocket magnifier or the time and effort required to put on reading glasses in order to verify the transaction.

In a preferred form of the invention, a typical card blank is subdivided into a plurality of zones, specifically a data zone and a non-data zone. The data zone is adapted for receiving and carrying machine readable information as prescribed by ISO standards. Information may be carried on the card in the form of a strip such as a magnetic strip including magnetically encoded information, embossed alpha numeric lettering for creating an imprint on the credit card transaction form, a bar code or variants thereof, and for electronic data, smart card IC contact area or contactless smart card keep out area, or a combination of smart card contact areas and contactless smart card keep out areas for so-called combi-cards. The non-data zone is generally free of any information required to be machine read, although this zone often includes identifying indicia, logo types and other information relating to the issuing institution. In one preferred form of the invention, a portion of the non-data zone includes an integral magnifying lens carried in and forming a part of the card. It has been found that a substantially rigid, transparent plastic material of a thickness corresponding to the thickness of the card base may be incorporated in a window provided in the base. In a preferred embodiment of the invention, the transparent plastic includes fresnel lens contours on one of its surfaces for defining a magnifying lens. By placing the lens in the non-data zone, the lens does not interfere with the machine transactions required in order to use the card for its primary purpose.

In a more specific embodiment of the invention, the lens is an elongated rectangle generally placed in parallel with the magnetic strip which is commonly attached to the back of the card. In this embodiment, there is no alteration of the data zone as commonly incorporated on cards.

A second embodiment of the invention incorporates a lens with a larger usable area. However, this particular embodiment requires alteration of the data zone. Depending on the issuing institution, one embodiment may be more desirable over the other, depending on the flexibility of the location and format of the data zones on the card.

In a typical wallet card, the base is made of a substantially semi-rigid plastic material which is printed on one or both sides and laminated with a thin material on both the top surface and the bottom surface thereof. The card may include identifying indicia, logotypes and the like on the top, a magnetic strip, a signature strip and various terms and conditions on the bottom. In one embodiment of the invention, the lens may be placed in the card prior to the laminating process, whereby the laminate cover materials may be used to overlap the edge of the lens and help retain it in the card. The lens may be sonically welded, adhesively secured or otherwise mounted in a window in the card base, with or without utilizing the laminate material of the card to assist in framing and mounting the lens in the card.

In another embodiment, the lens is integral with the card base. In this embodiment, the card base is formed from a transparent material, such as an amorphous plastic. The stamped card base can be overprinted, laminated with printed material, etc. Thereafter, fresnel lens contours are stamped on a surface of the blank in a selected area to define the magnifying lens. A hologram may also be added after the lamination.

In a particularly preferred embodiment, the inventive card comprises a substantially non-foldable yet still flexible semi-rigid base. The semi-rigid base comprises a magnifying lens. The card further comprises a strip, such as a magnetic tape strip, for carrying machine readable information, and optionally other features such as a signature strip or hologram patch.

The semi-rigid base can be a laminate formed from a plurality of layers, or can be a single layer. The magnifying lens may be formed by stamping fresnel contours directly onto a surface of the semi-rigid laminate, or a surface of a single layer. The fresnel contours are stamped into a transparent area of the laminate or single layer, and together with the transparent area form the magnifying lens.

There are also provided methods of producing a wallet card as described above. One such method comprises the steps of providing a transparent, substantially non-foldable semi-rigid base; forming a shallow cavity in the base; partially filling the cavity with a radiation or heat curable liquid resin; impressing a lens pattern on the surface of the resin with a die; and exposing the resin to radiation or heat of sufficient intensity to cure the resin.

Another method of producing a wallet card in accordance with the present invention comprises the steps of making a card blank having a transparent window region; heating a lens-forming die to a first temperature sufficient to soften the card blank; impressing the lens-forming die into the window region of the card blank; cooling the lens-forming die to a second temperature at which the card blank is not significantly softened; and withdrawing the lens-forming die to leave a lens pattern on the surface of the card blank. This procedure can be realized by providing the heat to soften the card blank with a sonic source as well as more conventional heat sources to imprint the lens pattern.

In yet another embodiment, a wallet card with a magnifying lens also includes one or more lights to illuminate objects being viewed in a darkened environment. The lights are activated by a pressure switch on the card.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 2 shows the bottom side of the wallet card of FIG. 1;

FIG. 4 shows the bottom side of the wallet card of FIG. 3;

FIG. 5 is a cross sectional view of the wallet card and lens combination, taking generally along the line 5—5 of FIG. 3;

Like elements are numbered alike throughout the drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
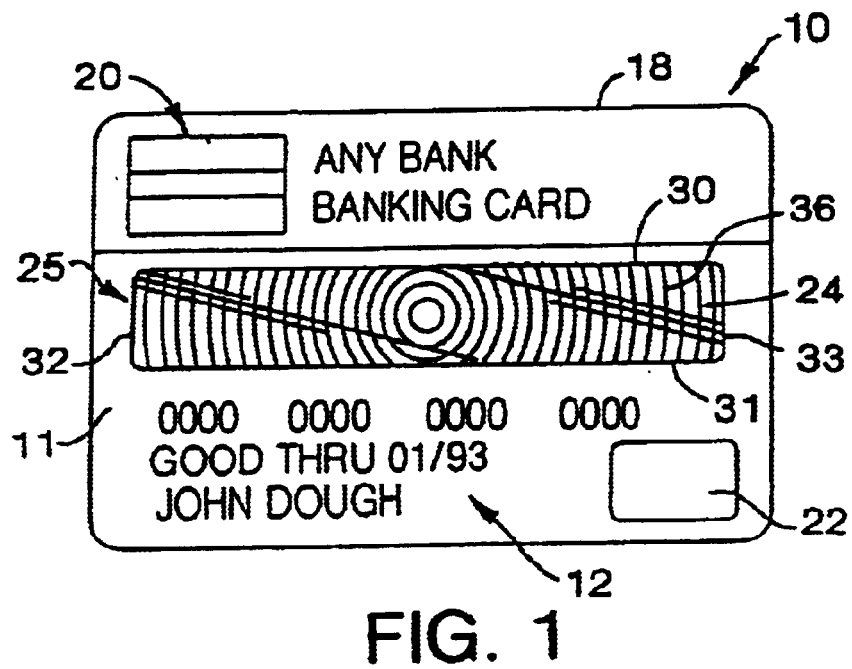
FIG. 1 shows the top side of a wallet card incorporating a magnifying lens, in accordance with the subject invention.

A typical credit card 10 is shown in FIG. 1. The size and general layout of card 10 have become standardized and similar cards are widely used for a variety of transactions and other purposes. Apart from credit cards, similar cards are used as debit cards, ATM access cards, driver's licenses, identification cards, library cards, etc. Such cards are typically carried in a wallet and are generally referred to herein as "wallet cards".

Card 10 includes, as is common, embossed lettering at 12, which is machine readable for permitting the credit card to be imprinted at a point-of-sale transaction. As is shown in FIG. 2, most credit cards now contain a strip 14 for carrying machine readable information, for example a magnetic strip material which includes magnetically encoded information readable by computer terminals utilized in many point-of-sale terminals. Also included is a signature strip 16 which is on the back of the card and which typically is adapted for receiving a signature to be manually applied by the user of the card. The card may further include one- or multi-dimensional bar codes as well as smart card contact, contactless or combi-card electronic information storage.

The magnetic strip 14 and embossed lettering 12, along with the signature strip 16, identify a data zone on the card. For financial transaction cards, this data zone is generally controlled by ISO standards in an effort to standardize the cards so that various cards issued by a multiplicity of institutions may be used on standardized terminals the point-of-sale. For example, the placement of the magnetic strip 14 relative to the top edge 18 of the card is standardized, as is the width of the strip 14 in order to permit ready readability of the magnetically coded information by any typical point-of-sale magnetic reader. Likewise, the font, size and position of the embossed lettering 12 is controlled to assure machine readability of the information imprinted from the card when a point-of-sale transaction is made on a typical credit card imprinter. Only the position of the signature strip 16 can be altered without interfering with the machine readability of the card.

Today, many cards also include identifying indicia such as logotypes and the like as indicated at 20 for identifying the issuing institution. An increasing number of cards also include a hologram patch 22 which includes issuing institution indicia. The hologram panel 22 is generally located in or near the portion of the data zone including the embossed lettering 12. In the embodiment of the invention shown in FIGS. 1 and 2, a magnifying lens 24 is positioned in a window 25 provided in the base 11 of the card 10 such that it is in noninterfering relationship with the magnetic strip 14 and the embossed lettering 12. The magnifying lens 24 is an elongate, rectangular lens mounted parallel to the magnetic strip 14 in the space between the magnetic strip and the embossed lettering. This space is generally sufficient in size to accommodate the lens 24 since it is required that the embossed lettering 12 be spaced sufficiently from the magnetic strip 14 to assure that the embossing of the card does not in any way alter the functionality of the magnetic strip.

In one embodiment of the invention, the lens member 24 comprises a substantially rigid, transparent plastic element having approximately the same rigidity as the credit card base. As shown in FIGS. 1 and 2, the credit card base 11 includes a window 25 having a top edge 30, a bottom edge 31 and side edges 32 and 33. The lens element 24 is adapted to be placed in the window 25 and has outer edges common with the window edges 30–33. The lens may then be sonic welded or adhesively secured to the credit card base 11 in the manner well known to those who are skilled in the art. In the preferred embodiment of the invention, the lens 24 is of a thickness corresponding to the thickness of the credit card base 11, assuring that the presence of the lens in the credit card does not interfere in any manner with the machine readability of the information contained in the embossed lettering 12 or in the magnetic strip 14. A fresnel-type contour lens has been found to be particularly useful for this type of application. Such a lens is formed with concentric fresnel contour lines 36.

Figure 3:
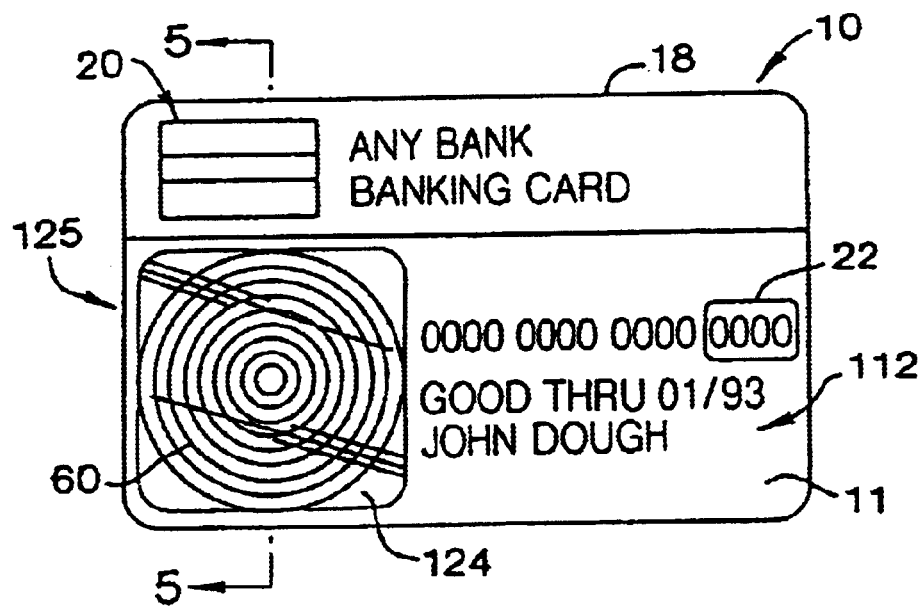
FIG. 3 shows the top side of an alternative embodiment of a wallet card incorporating a magnifying lens in accordance with the subject invention.

An alternative embodiment of the invention is shown in FIGS. 3 and 4. There, the lens element 124 is of a substantially square cross section utilizing a fresnel lens comprising the concentric circle configuration shown at 60, and mounted in a complementary window 125 in the base 11. This particular configuration of the invention is useful when it is possible to alter the shape of the data zone and the placement of the embossed lettering 112. As terminal encoders come more widely accepted, and the magnetic encoding strip 14 (FIG. 4) more commonly used as the source for machine readable information, the importance of the embossed lettering is becoming diminished. This will permit alteration of the placement of the embossed lettering on the card without interfering with the machine readability of the card at the point of sale. This permits the embossed lens element 124 to be customized to varying desires and taste without interfering with the overall machine readability of the card.

As is shown in FIG. 5, the typical card base 11 is a laminated composite member including a solid core material as shown at 48 with a thin plastic laminate 50 on the top surface and a similar thin plastic material 52 laminated on the bottom surface. The term "thin" herein denotes that thicknesses of the plastic laminates 50 and 52 are small relative to the thickness of core 48. If desired, the core 48 and plastic laminates 50 and 52 can have any relative thicknesses. The laminates 50 and 52 are generally printed in a four-color format, permitting attractive logotypes identifying the issuing institution and permitting customized color schemes for the card. The laminate materials 50 and 52 also carry the magnetic encoding strip 14, the signature strip 16 and the hologram panel 22.

As shown in FIG. 5, the fresnel lens element 124 is located in the window 125 of the card and may be secured therein by sonic welding, adhesives or the like along the side edges of the window, as at 60. Where a laminated card is used, the laminate material 50 and 52 may overlap the edges 62, 64 of the window and the lens 124 may include a peripheral lip or rim 58 for holding the lens in place. Of course, the lens may also be of a rectangular cross section and sonically welded or adhesively secured to the base 48 with or without use of the laminates 50 and 52.

Figure 6:
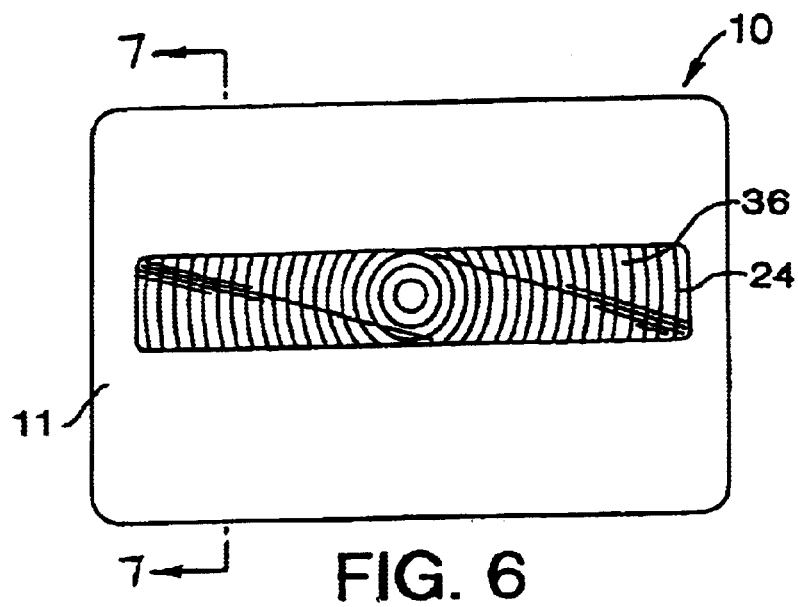
FIG. 6 shows the top side of a wallet card blank having an integral magnifying lens.
Figure 7:
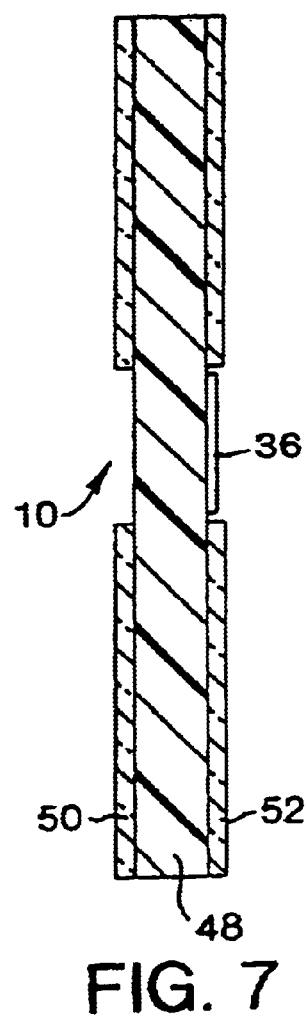
FIG. 7 is a cross sectional view of the wallet card blank of FIG. 6 taken generally along the line 7—7 of FIG. 6.

It will be understood that the lens could be incorporated in the card a variety of ways, including being an integral, unitary member of the card base. Integral, unitary lenses can be formed in a number of ways, such as by molding or casting a transparent material into a window of a semi-rigid base, or by stamping a transparent area of a semi-rigid base. FIG. 6 illustrates one such alternative embodiment of the invention in which the lens is integral with the card base. Card base 48 comprises a substantially transparent plastic material. Preferably, the material is an amorphous plastic, such as polyvinyl chloride (PVC), polycarbonate, polyester or any other similar material. Lens 24 is formed in the card base 48 by, for example, stamping the desired fresnel contour lines 36 onto a surface thereof. Embossed lettering (not shown) can be formed in the base simultaneously, or can be formed before or after the fresnel contour lines 36 are stamped onto the card base 48. Plastic laminates 50 and 52 can optionally also be applied to the top and bottom surfaces of the card base 48. The order in which the foregoing stamping, embossing and laminating steps are carried out is a matter of routine design choice. In a preferred embodiment, described in greater detail below, the fresnel contours 36 are hot-stamped after a card blank has been laminated.

Figure 8:
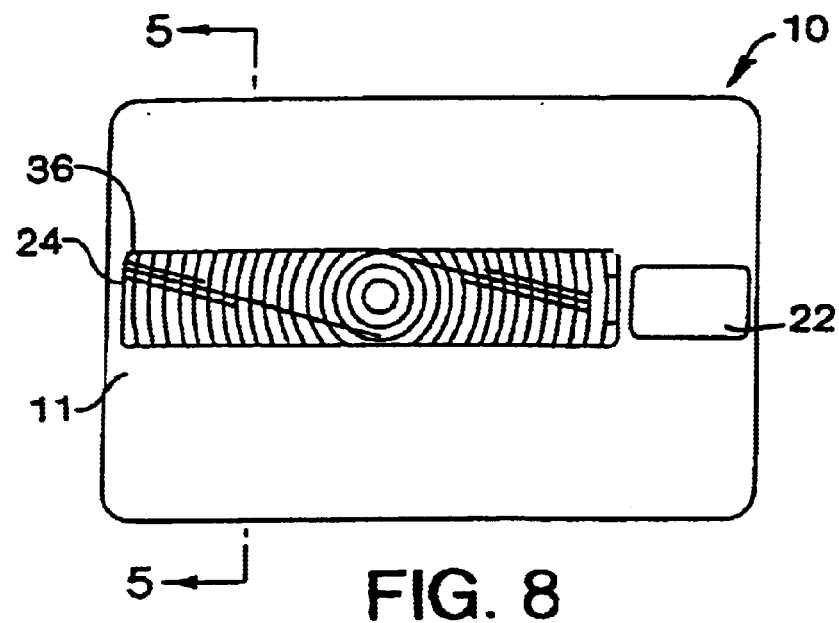
FIG. 8 shows the top side of a wallet card having an integral horizontally extending magnifying lens and a hologram patch.

As with the preceding embodiments, magnetic strips, signature strips, hologram patches, etc. can also be added in the conventional manner. For example, in FIG. 8, an embodiment of a card 10 includes a lens 24 which horizontally extends partially across card base 11. Card 10 also includes hologram patch 22. If desired, plastic laminates 50 and 52 can be omitted, and strips, patches, etc. can be applied directly to base 48.

Figure 9:
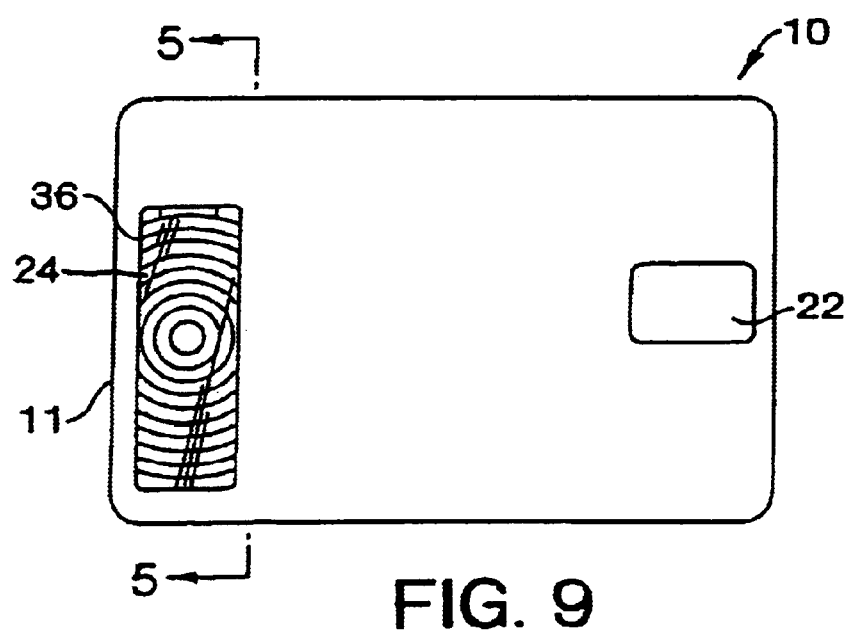
FIG. 9 shows the top side of a wallet card having an integral vertically extending magnifying lens and a hologram patch.

Another embodiment, shown in FIG. 9, includes a vertically-oriented lens 24 stamped on one side of card base 11, with hologram patch 22 disposed near the opposite side of card base 11. Such an embodiment can, of course, also be produced by mounting a separate lens 24 in a card base 11 in a manner similar to the embodiment shown in FIG. 1.

Figure 10:
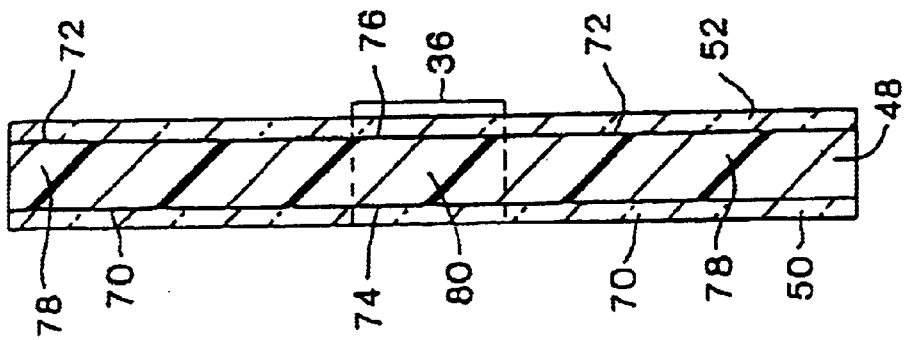
FIG. 10 is a cross-sectional view of a wallet card comprising three layers of material having aligned transparent areas, in which fresnel lines are formed in the top layer thereof to form an integral magnifying lens.

Still another embodiment is shown in FIG. 10. Card core 48 and bottom and top plastic laminates 50 and 52 comprise a substantially transparent plastic material, such as the amorphous plastics described above. Card core 48 can be comprised of a single layer, as shown, or can comprise multiple layers (a "split core"). Top and bottom plastic laminates 52 and 50 are laminated to core 48, forming top and bottom layers around a core layer. The structure thus forms a semirigid and substantially non-foldable base. Lens 24 (not shown) is subsequently formed by stamping the desired fresnel contour lines 36 onto the surface of either top layer 52 or bottom layer 50. Depending on the relative thicknesses of core 48 and layers 50, 52, fresnel contours 36 may be impressed into core 48 as well as the layer 50 or 52.

Preferably, core 48 and bottom and top plastic laminates 50 and 52 comprise the same substantially transparent plastic material. Bottom and top plastic laminates 50 and 52 preferably are colored over substantially all of their outer surfaces (areas 70 and 72), such as by printing, except for window areas 74 and 76. Core 48 can remain transparent, or can also be colored over substantially all of its lateral surfaces (areas 78 on either side of core 48), except for window area 80. The edges of core 48 can also optionally be colored. Window areas 74, 76 and 80 are located such that they are aligned when the laminate structure is formed. Together with fresnel contours 36, aligned window areas 74, 76 and 80 thus form magnifying lens 24.

The transparent material forming core 48 and top and bottom plastic laminates 50 and 52 should be chosen to display refractive properties such that, together with appropriately designed fresnel contour lines 36, a magnifying lens 24 having the desired magnification is produced. Selection of suitable plastic materials, and design of appropriate fresnel contours, is a matter of routine design choice to those skilled in the art.

Card 10 can include embossed lettering (not shown), as described previously, in addition to a magnetic strip and optionally a signature strip. A hologram patch can also be included other desired graphical features such as symbols, logos, pictorial representations, etc., can also be provided if desired. The magnetic strip, signature strip and/or hologram patch can be on either side of the card 10. That is, these features can be disposed on the same side of the card as the fresnel contours 36 are stamped on, or on the opposite side, in any desired combination. Placement of the various strips and patches in any embodiment of the instant invention is a matter of routine design choice.

However, in the foregoing embodiment it is preferable that no lamination steps are carried out after fresnel contour lines 36 have been formed, or at the least no lamination steps over the entire surface of card 10 including fresnel contour lines 36. This is because such subsequent lamination steps may fill in or flatten the fresnel contour lines 36 and thus render magnifying lens 24 inoperative.

Fresnel contour lines 36 can be stamped into bottom 50 or top 52 plastic laminate in any desired orientation, such as horizontally, vertically, etc., and can be of any desired shape, such as rectagular, square, triangular, circular, oval, elliptical, star-shaped, diamond-shaped, etc., similarly to the lenses 24 described previously.

Selection of a particular embodiment from those described herein can be made by the individual manufacturer taking into account factors such as manufacturing capability, ease of manufacture, cost, etc.

Figure 11:
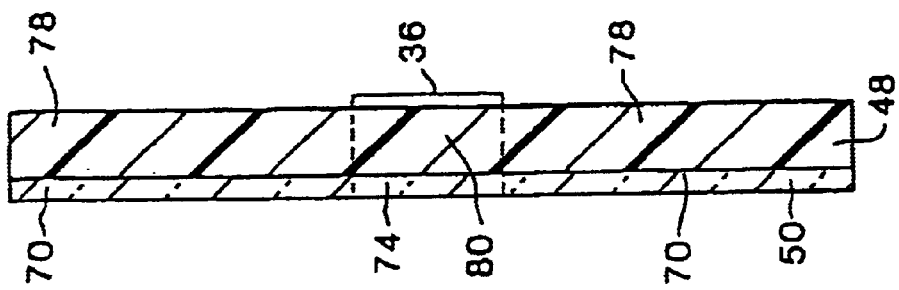

Another embodiment is shown in FIG. 11. Here, card core 48 functions as a "top" layer, while bottom plastic laminate 50 comprises the "bottom" layer. Core 48 and bottom plastic laminate 50 again comprise a substantially transparent plastic material. Bottom plastic laminate 50 is laminated to core 48, forming top and bottom layers. The two layers together form a semi-rigid, substantially non-foldable laminate structure. Lens 24 (not shown) is subsequently formed in core 48 by stamping the desired fresnel contour lines 36 onto the top surface thereof. Alternatively, the lens contours may be stamped onto the bottom surface of laminate 50.

As with the preceding embodiment, core 48 and bottom plastic laminate 50 preferably comprise the same substantially transparent plastic material. Bottom plastic laminate 50 preferably is colored over substantially all of one or both of its sides (areas 70), such as by printing, except for window area 74. When both sides are so colored, core 48 can remain transparent, thus allowing printed information on the inner surface of bottom plastic laminate 50 (the side to which core 48 is laminated) to be read through the transparent plastic material. In the alternative, core 48 can also be colored over substantially all of the surface opposite the surface to which it is laminated with bottom layer 50 (areas 78 on the outer side of core 48), except for window area 80. Window areas 74 and 80 are located such that they are aligned when the laminate structure is formed. Together with fresnel contours 36, aligned window areas 74 and 80 form magnifying lens 24.

Figure 12:
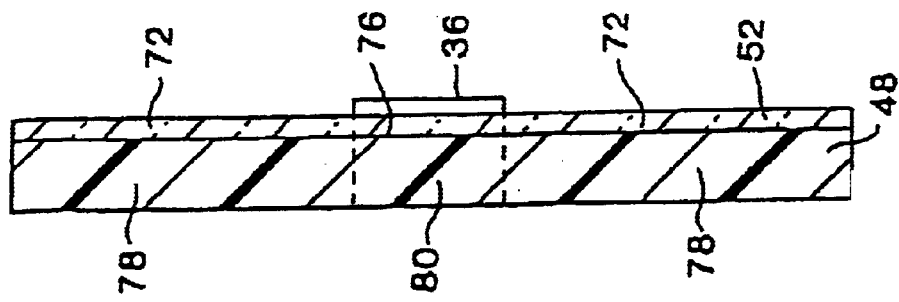
FIGS. 11 and 12 are cross-sectional views of wallet cards comprising two layers of a material having aligned transparent areas, in which fresnel lines are formed thereon to form integral magnifying lenses.

A variant of the foregoing preferred embodiment is shown in FIG. 12. Here, credit card core 48 functions as a "bottom" layer, while top plastic laminate 52 comprises the "top" layer. Core 48 and top plastic laminate 52 again comprise a substantially transparent plastic material. Top plastic laminate 52 is laminated to core 48, forming top and bottom layers. The two layers together form a semi-rigid, substantially non-foldable laminate structure. Lens 24 (not shown) is subsequently formed in top layer 52 by stamping the desired fresnel contour lines 36 onto the top surface thereof. Alternatively, the lens contours may be stamped onto the bottom surface of core 48.

Core 48 and top plastic laminate 52 preferably comprise the same substantially transparent plastic material. Top plastic laminate 52 preferably is colored over substantially all of one or both of its sides (areas 72), such as by printing, except for window area 76. When both sides are so colored, core 48 can remain transparent, thus allowing printed information on the inner surface of top plastic laminate 52 (the side to which core 48 is laminated) to be read through the transparent plastic material. In the alternative, core 48 can also be colored over substantially all of the surface opposite the surface to which it is laminated with top layer 52 (areas 78 on the outer side of core 48), except for window area 80. Window areas 76 and 80 are located such that they are aligned when the laminate structure is formed. Together with fresnel contours 36, aligned window areas 76 and 80 form magnifying lens 24.

Figure 13:
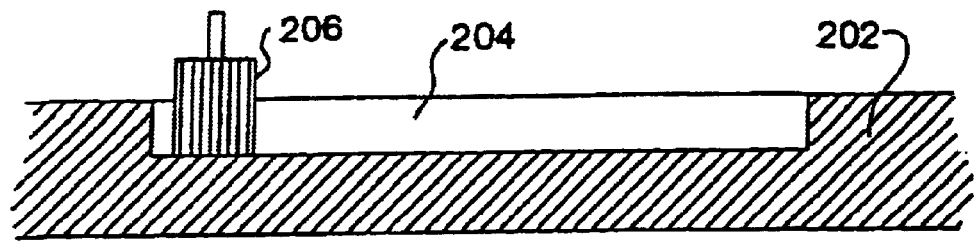
FIGS. 13–16 illustrate a method of fabricating the magnifying lens of the present invention.

One process for making a card in accordance with the invention is illustrated in FIGS. 13–16. Referring first to FIG. 13, a card blank or core 202 is provided. The core material is transparent and is preferably polyvinyl chloride (PVC) although other suitable transparent materials may be used. A shallow cavity 204 is formed in the core material with a router 206 or other suitable means. The dimensions of cavity 204 correspond to the desired dimensions of the lens 24 (FIGS. 1, 2, 6, 8 and 9) or lens 124 (FIGS. 3, 4). As already explained, cavity 204 should be located in a non-data region of the card. The depth of cavity 204 will depend on the particular material used to make the lens as described below, but is generally on the order of 0.008 inches. It is important to minimize any residual tool marks which will leave the floor of cavity 204 with a frosty appearance and thereby impair the clarity and sharpness of images viewed through the lens. If necessary, the floor of cavity 204 may be polished to remove residual tool marks.

Figure 14:
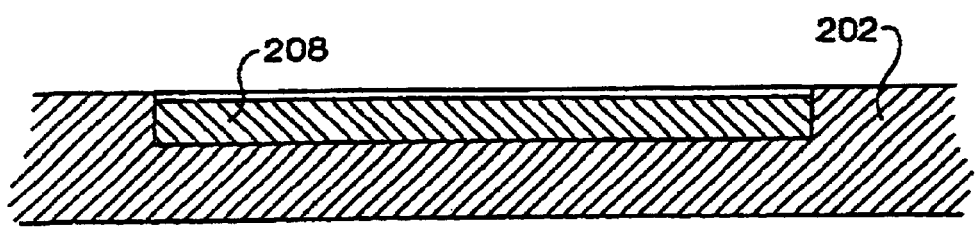

Referring now to FIG. 14, cavity 204 is partially filled with a liquid resin. The preferred class of resins for use with the method described herein comprises radiation-curable resins, with the curing of the resin being carried out by exposure to a suitable source of actinic radiation, such as ultraviolet light. A particular resin suitable for such use is a proprietary product of Decochem having the designation 7294 mod 7025. This particular material has been found to produce excellent replication of the lens die profile, good adhesion to the PVC card core and poor adhesion to the surface of the die. Other suitable radiation-curable resin systems or thermosetting resin systems may also be used.

Figure 15:
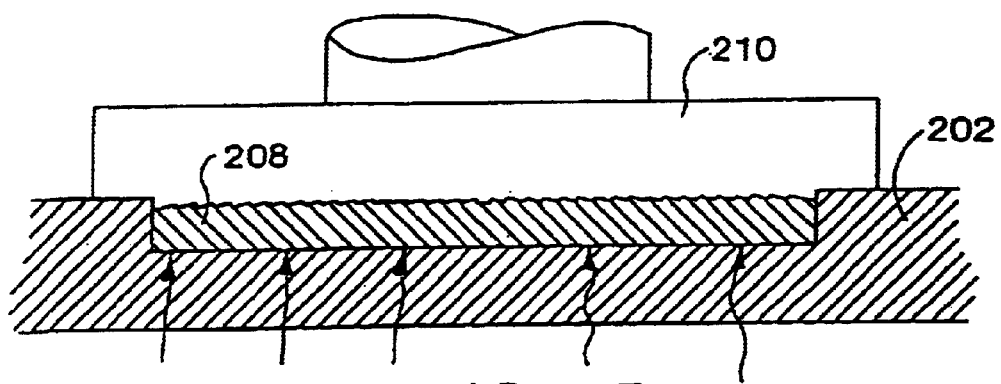

Referring to FIG. 15, once cavity 204 has been filled with a sufficient quantity of liquid resin, a die 210 is brought into contact with the surface of the resin. Die 210 is machined with a negative image of a fresnel lens pattern. The die is brought into contact with the surface of the liquid resin, taking care to prevent entrapment of air and expulsion of resin from the cavity. Once die 210 is properly positioned, resin 208 is exposed to the appropriate from of radiation or heat for a sufficient period of time to cure the resin. Using the preferred resin system, curing is accomplished in approximately 1–3 seconds.

Figure 16:
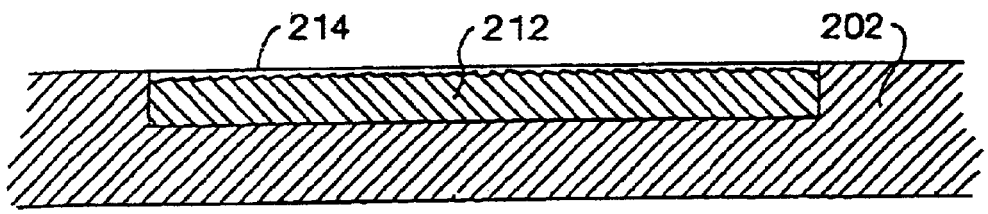

With reference to FIG. 16, the die 210 is removed after the resin has cured, leaving fresnel contours in the surface of the cured resin, thereby forming a lens 212. The lens contours are disposed below the upper surface of core 202, thereby helping to protect the lens from damage during routine handling.

Figure 17:
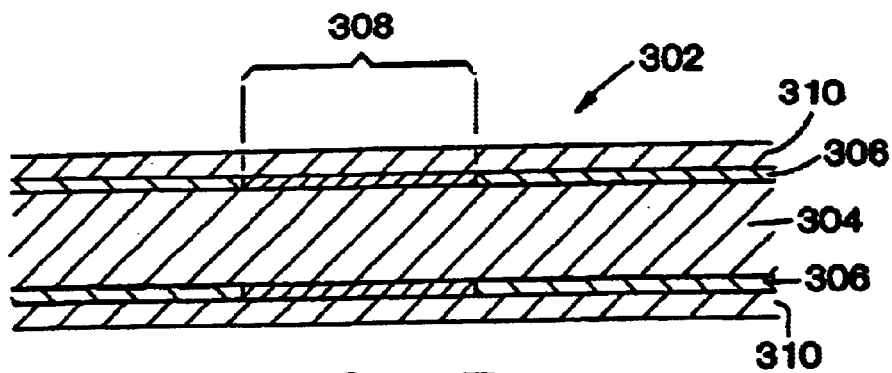
FIGS. 17–19 illustrate another method of fabricating the magnifying lens of the present invention.
Figure 18:
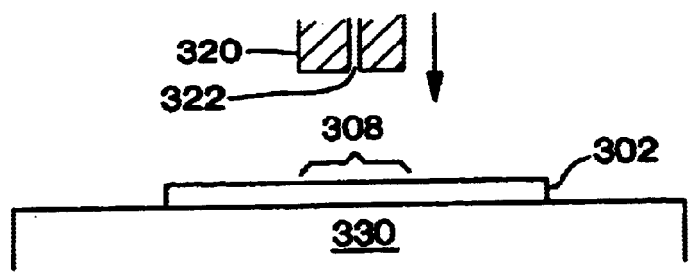
Figure 19:
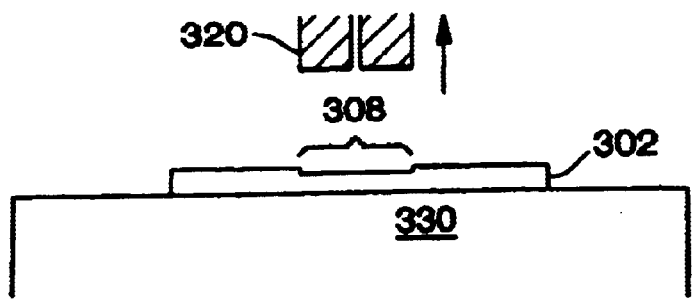

An alternative process for making a card in accordance with the present invention is illustrated in FIGS. 17–19. Referring first to FIG. 17, the structure of a card blank 302 prior to formation of the magnifying lens is shown in cross section. Card blank 302 comprises a laminated structure of several layers. Core material 304 is a transparent thermoplastic material. Suitable materials include PVC, polyethylene terephthalate modified with cyclohexanedimethanol (PETG) and polycarbonate, although other transparent plastic materials may also be used.

The top and bottom surfaces of core material 304 are printed with a silk screen and/or gravure process to provide the card graphics as previously described. Depending on the process used and the nature of the inks employed, the thickness of printed layers 306 may range from less than 1 to more than 5 mils. The printing applied to core 304 will generally be opaque, or at least translucent, over the entire card except for window region 308. This region must remain transparent for subsequent formation of the magnifying lens.

After printed layers 306 have been applied, the top and bottom surfaces of core 304 are laminated with clear films 310. Films 310 are preferably PVC or other suitable clear plastic material. Films 310 are suitably bonded to core 304. Such bonding may require use of a transparent adhesive to adhere over printed layers 306.

Films 310 typically have a thickness of about 1–3 mils. If printed layers 306 are relatively thick, it may be desirable to apply a clear ink or a clear adhesive in window region 308 at the time of printing. Otherwise, films 310 may have a tendency to "drape" across the window region with the potential for voids to form between films 310 and core material 304 in the window region. Such voids would degrade the optical properties of a magnifying lens formed in the window region.

Card blanks 302 may be conveniently manufactured in large sheets. Printing of core material 304 and lamination with films 310 is preferably done in large sheets. Individual card blanks 302 may then be die cut from the large sheets for further processing.

Referring next to FIG. 18, a magnifying lens is formed on card blank 302 with a hot stamping process using die 320. Prior to being impressed on card blank 302, die 320 is heated to a temperature which is sufficient to soften, but not necessarily melt, the plastic material of film 310 and core 304. Die 320 may be conveniently heated with a conventional heater cartridge, although sonic heating is an attractive alternative since it permits faster cycle times. Once the die has been brought up to temperature, it is impressed into card blank 302 to a depth sufficient to fully form the fresnel lens contours. An effective magnifying lens may be formed with contours having a depth of approximately 10 mils. In the case of sonic heating, heating and impressing may occur simultaneously.

It is important to maintain the die precisely parallel to the surface of the card so that the lens contours are formed uniformly within window region 308. Such uniformity is necessary for the magnifying lens to have the desired optical properties and also prevents warping of the finished card. The lens contours are preferably formed on the bottom surface of card blank 302; however, an equally effective lens can be formed on the top surface.

Die 320 preferably has a vent 322 so that air will not be trapped between the die and the surface of the card. Any such entrapment of air would interfere with proper formation of the lens contours and would degrade the optical properties of the lens. The need for vent 322 and its location, if needed, depend on the particular lens contour design.

Once die 320 has been impressed to a desired depth in card blank 302, the die is cooled so that the plastic will set before the die is withdrawn. Cooling of die 320 is important for the quality and transparency of the magnifying lens. Cooling the die prevents plastic flow when the die is withdrawn, thereby insuring that the contours of the fresnel lens have sharp edges. This is important for achieving a high quality lens. Furthermore, it has been found that withdrawing the die prior to cooling tends to cloud the plastic. Any suitable means for cooling die 320 may be employed. In practice, it has been found that cooling may be effectively accomplished with compressed air blown directly onto the die. Alternatively, the die may be fabricated with internal channels for liquid or air cooling. Regardless of the means by which the die is cooled, it is desirable to minimize the thermal mass of the die so that the temperature of the die can be rapidly cycled.

Using a hot stamping technique for forming the magnifying lens, it is important to confine the heat from the die as much as possible. Therefore, the platen 330 on which card blank 302 rests is preferably chilled. This helps to minimize distortions in the finished card.

Once the fresnel lens contours have been formed, the optical quality of the lens may be conveniently tested using a simple photocell test arrangement. Assuming the focal length of a properly formed lens, a light source is positioned in a spaced-apart relationship relative to the photocell. Light from the light source is focused onto the photocell by the hot-stamped lens. The output of the photocell is proportional to the focusing properties of the lens and provides a gross quantitative measure of lens quality. More sophisticated automated or manual image quality tests can also be implemented as appropriate for fresnel lenses.

The various embodiments of the invention described herein utilize a fresnel lens for magnification. Although this is the presently preferred type of lens for ease of manufacture, the invention is not limited in this regard. Suitable magnifying lenses may also comprise conventional convex lenses and other optical devices such as holograms. Whatever type of optical device is used for magnification, it may be mounted within the card or formed integrally with the card by any of the means previously described. The magnifying device may be formed in the core material, in a filler within a window in the core material and/or in a laminate applied over the core material.

Figure 20:
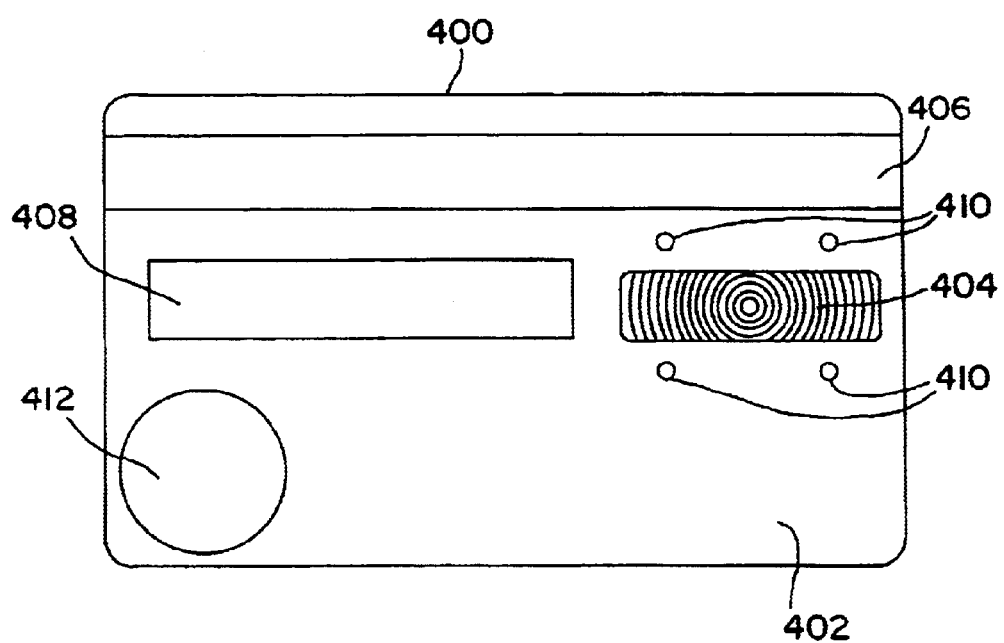
FIG. 20 is a bottom side view of a wallet card incorporating a magnifying lens and a light in accordance with the subject invention.

FIG. 20 illustrates a modification of the present invention. The bottom or reverse side 402 of a wallet card 400 is shown. Card 400 incorporates a lens 404 formed by any of the above-described methods. A magnetic stripe 406 and a signature panel 408 are provided as is customary. To assist the user in examining magnified objects in a darkened environment, lights 410 are disposed in proximity to lens 404. Lights 410 are preferably light-emitting diodes (LEDs), although any other suitable source of illumination may be utilized, such as conventional incandescent bulbs, electroluminescent panels or the like.

Lights 410 are powered by one or more batteries disposed within card 400. Conventional wafer cell batteries may be used or a flat laminated battery may be constructed integrally with the wallet card. Ultra-thin battery construction is described, for example, in U.S. Pat. No. 6,045,942.

To control operation of lights 410, a switch, such as switch 412, is placed at a convenient location on card 400. Switch 412 is preferably a pressure sensitive switch that may be activated by finger pressure when card 400 is held between the thumb and index finger.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A wallet card comprising:

a thin, flat, substantially rigid substrate;

a first area of the card carrying machine readable information;

a magnifying lens disposed within the substrate in non-interfering relationship with the first area.

2. The wallet card of claim 1 wherein the wallet card comprises a financial transaction card.

3. The wallet card of claim 2 wherein the wallet card comprises a credit card.

4. The wallet card of claim 1 wherein the magnifying lens is a Fresnel lens.

5. The wallet card of claim 4 wherein the Fresnel lens comprises a series of contour lines formed in a surface of the substrate.

* * * * *